United States Patent

Numasaki et al.

[11] 4,008,994
[45] Feb. 22, 1977

[54] APPARATUS AND METHOD FOR REGENERATION OF SPENT WET ACTIVE CARBON

[75] Inventors: Kouichi Numasaki, Yokohama; Nobutaka Ninomiya, Nagaokakyo; Zenji Matsumoto, Izumi, all of Japan; Kiyoshi Adachi, Penang, Malaysia; Toyohisa Fujimoto, Shimizu, Japan

[73] Assignees: Japan Gasoline Co., Ltd., Toyko; Takeda Chemical Industries, Ltd., Osaka, both of Japan

[22] Filed: May 8, 1975

[21] Appl. No.: 575,597

[30] Foreign Application Priority Data

May 15, 1974 Japan .............................. 49-53991

[52] U.S. Cl. .................................... 432/14; 432/99; 432/102; 34/168
[51] Int. Cl.² ....................................... F27B 15/10
[58] Field of Search ............................ 432/95–102, 432/14, 17, 18, 31, 58; 34/86, 168, 167; 110/15; 266/25

[56] References Cited

UNITED STATES PATENTS

| 2,610,412 | 9/1952 | Rasmussen | 34/89 |
| 3,544,096 | 12/1970 | Buchner | 432/99 |
| 3,659,829 | 8/1972 | Pospisil et al. | 432/18 |

FOREIGN PATENTS OR APPLICATIONS

| 49-94594 | 9/1974 | Japan | 432/14 |
| 1,118,354 | 7/1968 | United Kingdom | 432/14 |

Primary Examiner—John J. Camby
Assistant Examiner—Henry C. Yuen
Attorney, Agent, or Firm—Woodhams, Blanchard and Flynn

[57] ABSTRACT

The present invention provides an apparatus, and a method for the regeneration of spent wet active carbon, which apparatus comprises a drier for substantially drying the spent carbon, a heating furnace provided with at least one burner and at least one duct, and a regeneration chamber consisting of at least one set of inner cylinder and outer cylinder installed concentrically and vertically inside said heating furnace to penetrate the top and bottom walls of the furnace, wherein said inner and outer cylinders have respectively a multiplicity of holes penetrating the side walls thereof, said inner cylinder is connected with a supply tube for a regeneration gas capable of effecting regeneration of the dried carbon-to-be-regenerated upon contact therewith, the upper end of said outer cylinder is connected with said drier so as to receive said dried carbon therefrom while the lower end thereof forms an outlet for the regenerated carbon, and said duct is connected with the drier so as to facilitate direct or indirect utilization of the sensible heat of the combustion exhaust gas in drying the spent active carbon.

14 Claims, 3 Drawing Figures

APPARATUS AND METHOD FOR REGENERATION OF SPENT WET ACTIVE CARBON

BACKGROUND OF THE INVENTION a. Field of the Invention

The present invention relates to an improved apparatus and method for the regeneration of spent wet active carbon, and more particularly it relates to the treatment of the spent carbon that is exhausted from water pollution control devices.

b. Description of the Prior Art

The regeneration of spent carbon seems to be generally performed through three steps of drying, calcination and reactivation by supplying the spent carbon-to-be-treated, batchwise or continuously, into a chamber made of materials having a good thermal conductivity and a heat resistance and installed inside a heating furnace and introducing regeneration steam into said chamber while heating the chamber externally. In the case of the conventional regeneration apparatuses as prevalently employed, granting that it varies with the construction of apparatus, the degree of wetness of the spent carbon, the applied amount of regeneration steam, etc., about 50% of the quantity of heat supplied to the regeneration chamber is generally consumed in evaporating the moisture from the spent carbon, so that, at present, these apparatuses are being operated under the condition that the degree of contribution of the supplied heat to the calcination and reactivation actions, which are most important in the regeneration operation, is restricted that much.

The present inventors have previously proposed, in the Japanese patent Application No. 7484/1973, a regeneration apparatus for spent carbon, wherein a vertical outer cylinder having a feed inlet for the spent carbon-to-be-treated provided on the upper end and an outlet for discharging the resulting product in a fixed quantity provided on the lower end thereof is installed centrally in a vertical heating furnace having at least one burner, and at least one duct with a damper, an inner cylinder sealed at the lower end thereof having a regeneration gas supply tube and a duct with a damper is inserted centrally in said outer cylinder, a multiplicity of inclined annular plates with a slope steeper than the angle of repose of the spent carbon-to-be-treated are provided in vertically multistage fashion on both the inner periphery of said outer cylinder and the outer periphery of said inner cylinder by vertically staggering the inclined annular plates of the outer cylinder relative to the inclined annular plates of the inner cylinder, and holes are provided through both the wall of said outer cylinder and the wall of said inner cylinder. The regeneration apparatus according to this proposition is constructed such that the spent carbon fed through the top of the annular regeneration chamber is subjected to high temperature heating, said heat being supplied through the outer cylinder wall while descending inside said chamber installed within the heating furnace, and also comes in contact with the regeneration gas, for instance, regeneration steam, diffused therein through the holes penetrating the inner cylinder wall, whereby the drying, calcination and reactivation progress, in order, downwards from the top of the chamber. At the same time, the moisture and adsorbed substances liberated from the spent carbon are in the form of gas diffused in the combustion zone within the heating furnace through the holes penetrating the outer cylinder wall together with the regeneration steam and are brought into contact with the high-temperature combustion gas, whereby conbustible matters are incinerated. In this way, the apparatus is designed so as not to exhaust harmful and odorous substances to the outside of the system. Meanwhile, the present inventors have further studied the profile of heat consumption as viewed along the axial direction of the regeneration chamber at the time of effecting regeneration of the spent carbon by the use of the above proposed apparatus and discovered the fact that about half of the supplied quantity of heat is consumed in the drying process, hence an economical question arises. This drawback is considered as mainly ascribable to the fact that the spent carbon-to-be-treated usually contains approximately 50% of moisture and this wet active carbon is supplied as it is to a zone for a drying step which is identical with that for calcination and reactivation steps in requiring such a high temperature as in the range of from 800° to 1000° C. Besides, said apparatus is disadvantageous from the viewpoint of the cost of construction thereof, too. That is, in the regeneration process, said calcination and reactivation are particularly required to be performed in a high-temperature zone, so that the regeneration chamber must be built of expensive heat-resisting materials. Therefore, if the drying is to be performed in one and the same zone together with the calcination and reactivation, it will require the provision of a regeneration chamber with path elongated that much, entailing the enlargement of the heating furnace to accommodate said chamber.

SUMMARY OF THE INVENTION

From the foregoing viewpoint, the present inventors have succeeded in not only enhancing the thermal efficiency as a whole but also reducing the cost of construction of the apparatus by providing an apparatus wherein the drying step of the spent carbon is performed outside the heating furnace by bringing the spent carbon into contact with either the combustion gas of the heating furnace directly or hot air obtained through heat exchange between the conbustion exhaust gas from the heating furnace and air, thereby to evaporate the greater part of the moisture therein, while the calcination and reactivation are performed mainly in the regeneration chamber within the heating furnace. Especially in the latter case where heat is recovered by heat exchange between the combustion exhaust gas and air, the hot air obtained thereby is directly brought into contact with the spent carbon to perform the drying and thereafter the hot air is further employed as the air for conbustion in the heating furnace, there is no fear of secondary public nuisances ascribable to gases liberated from the spent carbon-to-be-treated, so that an apparatus thus designed is quite suitable for use as apparatus related to the prevention of public nuisances as well as for achieving a superb thermal efficiency.

Accordingly, an object of the present invention is to provide an apparatus for the regeneration of spent wet active carbon, which comprises a drier for substantially drying the spent carbon, a heating furnace provided with at least one burner and at least one duct, and a regeneration chamber consisting of at least one set of an inner cylinder and an outer cylinder installed concentrically and vertically inside said heating furnace to penetrate the top and bottom walls of the furnace, wherein said inner and outer cylinders have respectively a multiplicity of holes penetrating the side walls thereof, said inner cylinder is connected with a supply tube for a regeneration gas capable of effecting regeneration of the dried carbon-to-be-regenerated upon contacting therewith, the upper end of said outer cylinder is connected with said drier so as to receive said dried carbon therefrom while the lower end thereof forms an outlet for the regenerated carbon, and said duct is connected with the drier so as to facilitate direct or indirect utilization of the sensible heat of the conbustion exhaust gas in drying the spent carbon.

A further object of the present invention is to provide a method of regenerating spent wet active carbon by bringing same into contact with a regeneration gas capable of regenerating said spent carbon by reacting therewith within an externally heated regeneration chamber installed inside a heating furnace, which comprises previously drying said spent carbon by applying thereto the sensible heat of the conbustion exhaust gas from said heating furnace directly or indirectly.

Hereunder will be described the mode of practicing the present invention by reference to the attached drawings.

Figure 1:
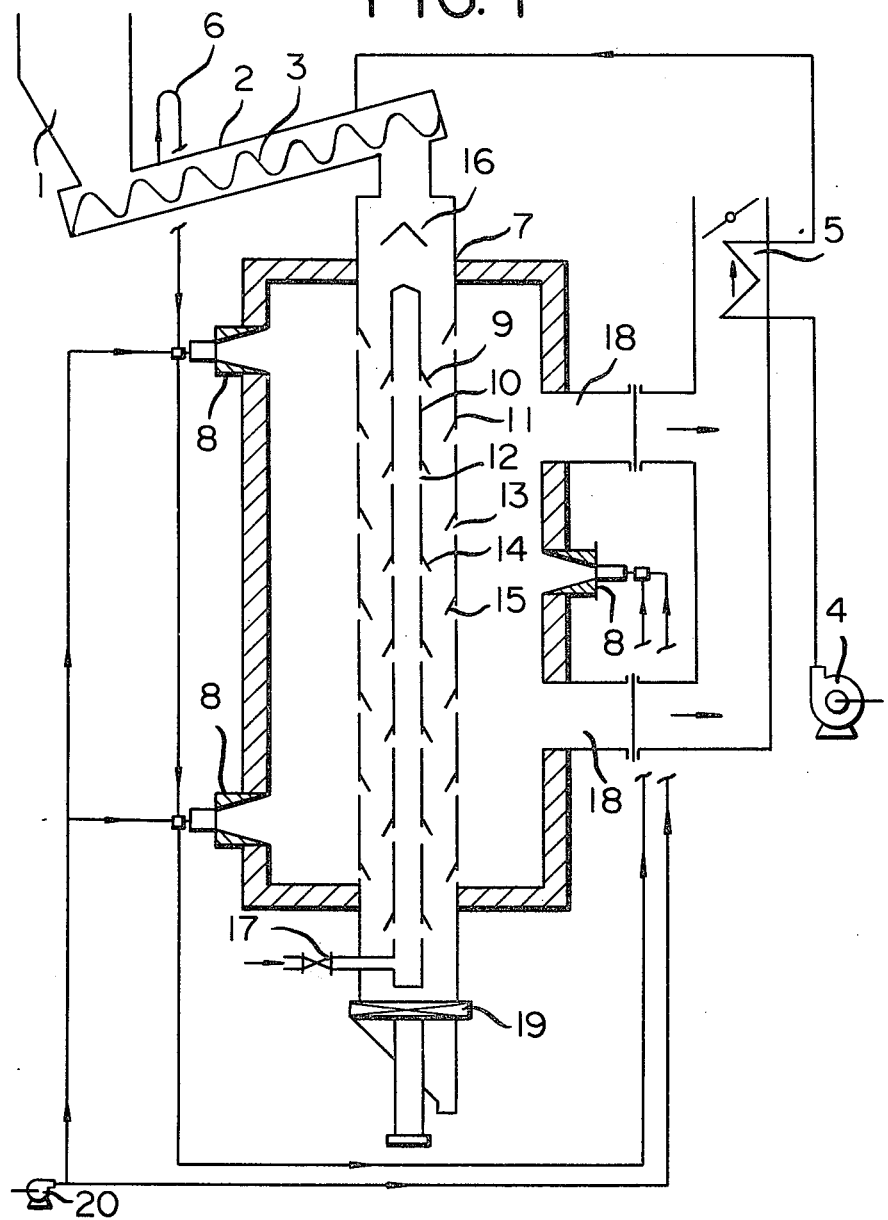
FIG. 1 is a schematic view of a first embodiment of the invention.

FIG. 1 illustrates one embodiment of the present invention wherein the sensible heat of the combustion gas of the heating furnace is utilized for preheating the air for use in combustion and the resulting high-temperature air is applied in effecting the drying of the spent carbon. The spent carbon-to-be-regenerated is supplied from a hopper 1, and in the course of being transferred by the screw 3 of a direct-heating type drier 2 (a drier devised to heat the material directly with a heat transfer medium) it is directly brought into contact with hot air fed in by blower 4 and whose temperatures is elevated in an air-heater means 5, whereby the spent carbon is dried. The hot air furnishes its sensible heat for evaporation of the moisture contained in said spent carbon, and the hot air keeps moving together with the evaporated moisture, in a direction opposite the direction of movement of the spent carbon within the drier 2 and is taken out through a hot air exhaust pipe 6. It is preferable to further utilize this hot air as the air for conbustion in burners 8 of a heating furnace 7. The active carbon dried in the drier 2 is fed to a regeneration chamber 9 installed inside the heating furnace 7, descends in said chamber by the force of gravity, and is subjected mainly to calcination and reactivation while thus descending. The regeneration chamber 9 consists of an annular chamber composed of an inner cylinder 10 for the purpose of supplying a regeneration gas such as regeneration steam and an outer cylinder 11 for the purpose of receiving the heat for regeneration, and the combustion gas therein is maintained at a temperature in the range of from 800L to 1000LC. The walls of the respective cylinders are provided with a multiplicity of penetrating holes 12 and 13, and further annular plates 14 and 15 which are disposed above each hole and are inclined downward by are provided for the exterior of the inner cylinder and the interior of the outer cylinder, respectively. The active carbon dried in the drier 2 is distributed by a distributor 16 positioned in the upper part of the annular chamber 9, and descends in said chamber by the force of gravity. While thus descending, it is brought into contact with the regeneration steam supplied through a nozzle 17 the in the lower part of the inner cylinder 10 and the regeneration steam is introduced into the chamber through the holes 12 penetrating the inner cylinder wall, and is subjected to high temperature heating, said heat being applied through the outer cylinder wall 11, thereby to release the adsorbed substances. The adsorbed substances flow out in the form of gas through the holes 13 penetrating the outer cylinder wall into the heating furnace together with the regeneration steam, burn upon contacting with a high-temperature conbustion gas within the furnace, pass through a duct 18 together with the combustion gas, impart its sensible heat to air in the air-heater means 5, and is thereafter discharged as the combustion exhaust gas. Meanwhile, the regenerated active carbon is recovered by, for instance, a table feeder type exhaust device 19. The reference numeral 20 denotes a fuel feed pump for the heating furnace.

Figure 2:
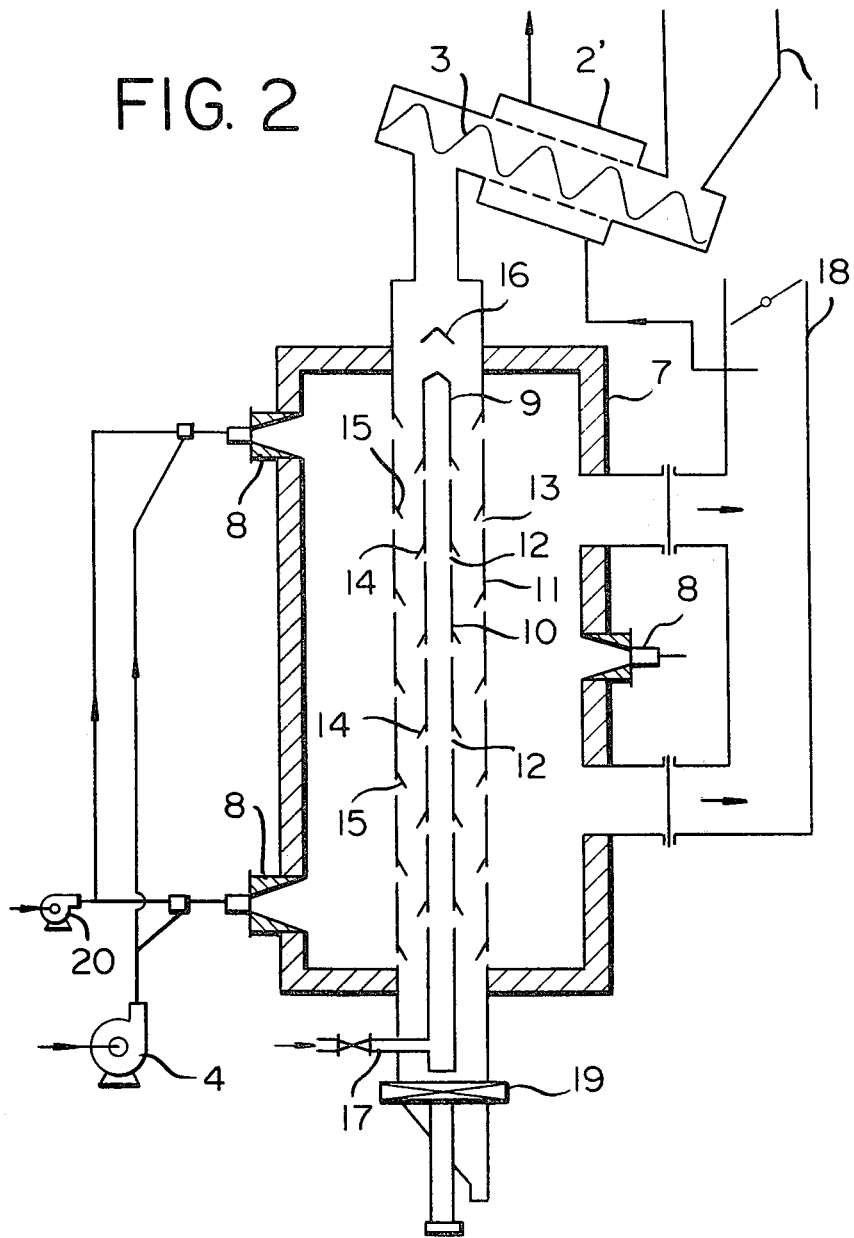
FIG. 2 is a schematic view of a second embodiment of the invention.

FIG. 2 illustrates another embodiment of the present invention, wherein the drying of the spent carbon is performed indirectly by the use of the combustion gas of the heating furnace. In FIG. 2, the spent carbon is indirectly heated in an indirect-heating type drier 2 (a drier devised to heat the material indirectly with a heat transfer medium) consisting of, for instance, an indirect-heating type screw feeder by means of the high-temperature conbustion exhaust gas from the heating furnace 7, and is subjected to the same regeneration treatment as in the case of the apparatus shown in FIG. 1 except that it is introduced into the regeneration chamber 9 together with the moisture (in the form of gas) released on the occasion of said indirect heating.

In the present invention, it is further possible to perform the drying by introducing the combustion exhaust gas from the heating furnace into the drier to contact same directly with the spent carbon. In this case, the material active carbon is preferably such one as being free of odorous or harmful components involving troubles relating to public nuisances.

In the foregoing apparatuses, there are employed a set of inner cylinder and outer cylinder both of which are provided with inclined annular plates so as to facilitate the mixing and contact action, but it is also possible to apply an apparatus wherein either the inner cylinder or the outer cylinder is exclusively provided with the inclined annular plates and an apparatus wherein neither of the inner and outer cylinders is provided with said plates. Further, although the foregoing apparatuses employ a product discharge device of table feeder type, it also will do to apply well-known devices for discharging the product in fixed quantities or a simple discharge mechanism. The inner cylinder and outer cylinder constituting the regeneration chamber are preferably made of materials having a good thermal conductivity and heat resistance. As the regeneration gas, steam is suitable, but other gases such as nitrogen gas are also applicable. The regeneration gas supply system may concurrently serve as the system for supplying air for use in combustion to the burners. Further, the burners may be optionally disposed in the heating furnace, but, in order to effect uniform heating by rotating the combustion gas within the furnace, it is preferable to arrange them tangentially relative to the heating furnace. Besides, in order to effect the regeneration of material active carbon and the combustion of released gases to perfection, it is advisable either to introduce hot air into the regeneration chamber to serve as the air for secondary combustion such as shown in FIG. 1 or to allot excess air in advance to be fed to the burners for use in primary combustion.

Figure 3:
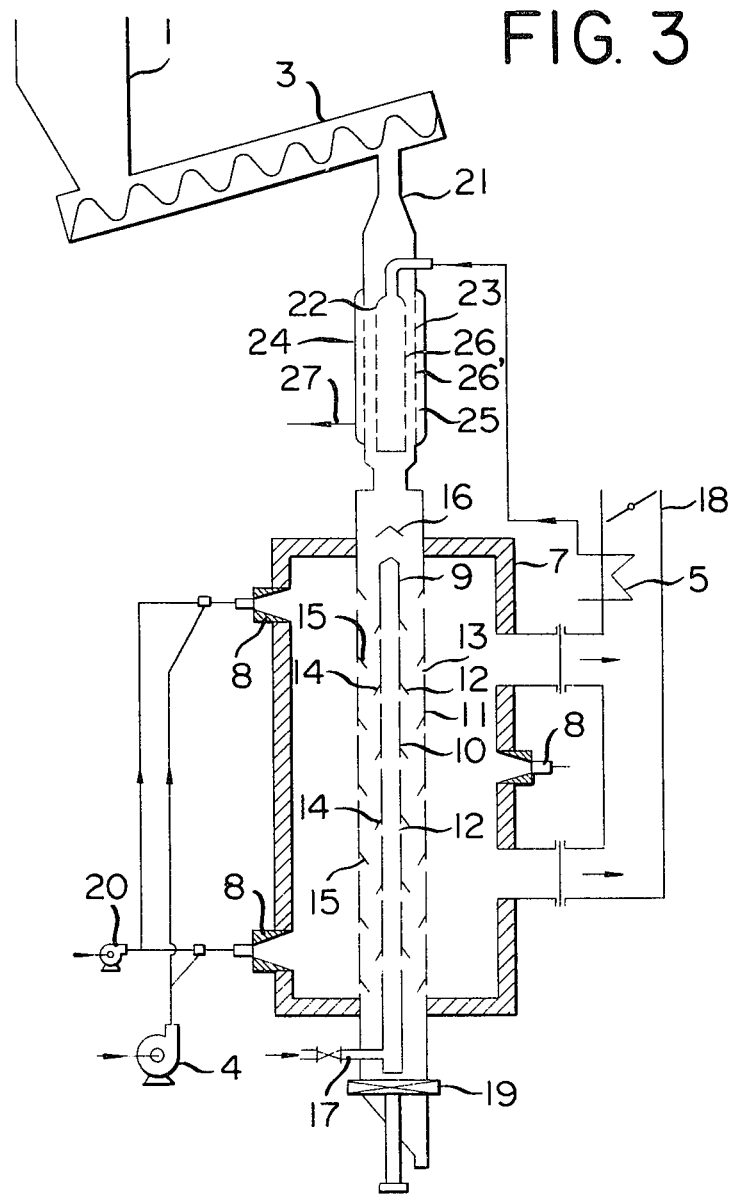
FIG. 3 is a schematic view of a third embodiment of the invention.

FIG. 3 is an illustrative of a still another embodiment of the present invention, wherein the drying of the spent carbon is performed easily and directly by using the hot air obtained by heat-exchange with the flue gas from the heating furnace in a drying means 21 placed between the screw feeder 3 and the regeneration chamber 9. In the drawing, the accompanied water in the spent carbon is drained away in the screw feeder 3 and then the carbon enters into the drying means 21 where the carbon is dried by directly contacting with the hot air obtained by heat exchange with the flue gas from the heating furnace 7. The drying means 21 is composed of a hot air distributor 22, a drier tube 23 connected to the top of outer tube 11 and a jacket 24 concentrically installed with each other. The walls of both of the hot air distributor 22 and the drier tube 23 are provided with a lot of small penetrating holes 26 and 26', respectively, for passing the hot air. Thus the dewatered carbon fed via the screw feeder 3 is dried by contacting with the hot air introduced via the hot air distributor 22, as it decends through the annular space between said hot air distributor and the drier tube, and then the hot air containing water vapour released from the spent carbon is discharged thru a discharge line 27 after being collected in a jacket chamber 25. The construction and the action of the other parts, for example, the regeneration chamber 9, the heating furnace 7, the regenerated-carbon discharging means etc. in this embodiment are substantially equivalent to the foregoing embodiments of the apparatuses according to the present invention.

Hereunder will be given examples embodying the present invention.

DESCRIPTION OF THE PREFERRED EMBODIMENTS

Example 1.

Spent wet active carbon(having moisture almost equivalent to the weight of the active carbon in dry state)exhausted from the water treatment plant in an oil refinery was subjected to regeneration treatment by the use of two apparatuses of the same type as shown in FIG. 1, one having a capacity of 1 ton/day and the other having a capacity of 3 ton/day and the result of the operation in which the heat of the exhaust gas was not recovered was compared with the result of the operation in which the heat of the exhaust gas was recovered but the hot air obtained was supplied to the heating furnace without passing the drier to serve as air for combustion in the heating furnace.

The result of said comparison was as shown in the following table.

| Regenerative Capacity T/D | 1.0 | | 3.0 | |
| --- | --- | --- | --- | --- |
| drier | not provided | provided | not provided | provided |
| quantity of air required Nm³/Hr | 400 | 270 | 1100 | 730 |
| quantity of fuel required Kg/Hr | 27.75 | 18.68 | 76.50 | 50.48 |
| temperature of air at the outlet of air-heater means ° C | — | 598 | — | 630 |
| temperature of air flowing in heating furnace ° C | 20 | 300 | 20 | 300 |
| temperature within furnace ° C | 1000 | 1000 | 1000 | 1000 |
| temperature of exhaust gas ° C | 800 | 800 | 800 | 800 |
| temperature of released gases ° C | 800 | 297 | 800 | 264 |
| thermal efficiency % | 20.6 | 30.6 | 22.4 | 34.0 | fuel: kerosene LHV =10400 Kcal/kg
quantity of excess air: 30%
quantity of air required: 1442 Nm³/kg.fuel =18.67 kg/kg.fuel
quantity of exhaust gas: 15.55 Nm³/kg.fuel
molecular weight of exhaust gas: 28.7

What is claimed is:

1. A method for regenerating spent wet active carbon, utilizing a drier, a heating furnace, at least one regeneration chamber disposed inside said furnace, said regeneration chamber being defined between concentric, radially spaced, inner and outer cylinders which extend vertically in said furnace, said inner and outer cylinders each having a multiplicity of holes through the side walls thereof, comprising the steps of: feeding a stream of wet spent carbon through said drier and therein evaporating water from said spent carbon by heating same with a stream of heated gas wherein the heated gas utilizes the sensible heat of the gaseous products of combustion discharged from said furnace; feeding the stream of dry spent carbon from the drier vertically downwardly into said regeneration chamber so that the spent carbon falls downwardly, by gravity, through the space between said cylinders, simultaneously flowing a regeneration gas through said inner cylinder and outwardly through said holes in the side wall of said inner cylinder into contact with the spent carbon falling downwardly in the regeneration chamber, and simultaneously burning a fuel in said furnace to heat the spent carbon falling downwardly in the regenerating chamber and discharging the gasified substances from the spent carbon through said holes in the wall of said outer cylinder into the furnace so that said substances are burned in said furnace; removing the regenerated active carbon from the lower end of said outer cylinder; discharging the gaseous products of combustion from said furnace and utilizing the sensible heat thereof to evaporate water from the spent carbon in the drier.

2. A method according to claim 1, wherein said regeneration gas is selected from the group consisting of steam, nitrogen and combustion gas.

3. A method according to claim 1, wherein said spent carbon is dried by bringing it into direct contact with hot air obtained through heat exchange between said gaseous products of combustion and air.

4. A method according to claim 3, wherein the air used for the drying of the spent carbon and accordingly containing moisture in the form of gas is employed as the air for combustion in the heating furnace.

5. A method according to claim 1, wherein the drying of the spent carbon is performed by indirectly heating same with said gaseous products of combustion.

6. An apparatus for regenerating spent wet active carbon, comprising: a drier for substantially drying the spent carbon, said drier including means for feeding a stream of spent carbon and means for supplying a stream of heated gas in heat exchange relationship with said spent carbon to evaporate water therefrom; a heating furnace having at least one burner for burning a fuel and also having at least one duct for discharging gaseous products of combustion from said furnace; at least one regeneration chamber disposed within said furnace for being heated by combustion of fuel in said furnace, said regeneration chamber being defined between concentric, radially spaced, inner and outer cylinders that extend vertically in said furnace and at least said outer cylinder penetrates through the top and bottom walls of said furnace, said inner and outer cylinder each having a multiplicity of holes through the side walls thereof; the upper end of said outer cylinder being connected to said drier for receiving dried spent carbon therefrom so that said dried spent carbon falls downwardly, by gravity, through the space between said cylinders, and the lower end of said outer cylinder having means to discharge the regenerated carbon; means connected to said inner cylinder for supplying regeneration gas thereto so that the regeneration gas flows through the openings in the inner cylinder into the space between said cylinders to contact the spent carbon falling downwardly therein to regenerate same and the substances adsorbed in the spent carbon are gasified and flow out through the openings in the outer cylinder into the furnace and are burned therein; and means for utilizing the sensible heat of the gaseous products of combustion flowing through said duct to evaporate water from the spent carbon in said drier.

7. An apparatus as claimed in claim 6 in which said means for utilizing the sensible heat of the gaseous products of combustion comprises an indirect heat exchanger disposed in said duct, means for flowing air through said heat exchanger so that the air is heated by the gaseous products of combustion flowing through said duct, and means for feeding the heated air from said heat exchanger into said drier.

8. An apparatus as claimed in claim 7 in which said heated air is flowed into direct contact with the spent carbon as it moves through said drier.

9. An apparatus as claimed in claim 8 in which said drier comprises a screw feeder for advancing the spent carbon and simultaneously agitating same while said heated air flows through said conveying means countercurrent to the spent carbon, and means for supplying the heated air removed from said drier to said furnace to serve as the combustion air for the fuel therein.

10. An apparatus as claimed in claim 8, in which said drier is an upright duct connected to the upper end of said outer cylinder.

11. An apparatus as claimed in claim 6 in which said drier comprises means for flowing the gaseous products of combustion flowing through said duct in indirect heat exchange relationship with the spent carbon as it moves through the drier.

12. An apparatus as claimed in claim 11 in which said drier comprises a screw feeder for advancing the spent carbon and simultaneously agitating same while the wall of the screw feeder is externally heated by the gaseous products of combustion from said duct.

13. An apparatus according to claim 6, wherein two or more regeneration chambers are provided within said heating furnace.

14. An apparatus according to claim 6, wherein inclined annular plates with a slope steeper than the angle of repose of the spent carbon are provided on the inside wall of the outer cylinder and/or the outside wall of the inner cylinder.

* * * * *

UNITED STATES PATENT AND TRADEMARK OFFICE
CERTIFICATE OF CORRECTION

PATENT NO. : 4 008 994

DATED : February 22, 1977

INVENTOR(S) : Kouichi Numasaki, Nobutaka Nimomiya, Zenji Matsumoto, Kiyoshi Adachi and Toyohisa Fujimoto It is certified that error appears in the above-identified patent and that said Letters Patent are hereby corrected as shown below:

Column 5, line 68; cancel "but" and replace by ---and---.

Column 6, line 1; cancel "without passing" and replace by ---after passing through---.

Signed and Sealed this

Fourth Day of October 1977

[SEAL]

Attest:

RUTH C. MASON
Attesting Officer

LUTRELLE F. PARKER
Acting Commissioner of Patents and Trademarks